3,211,716
CYCLIC DECAPEPTIDES AND PROCESS FOR THEIR MANUFACTURE

Robert Schwyzer, Riehen, Switzerland, assignor to Ciba Corporation, a corporation of Delaware
No Drawing. Filed Apr. 28, 1959, Ser. No. 809,355
Claims priority, application Switzerland, Apr. 29, 1958, 58,929/58
1 Claim. (Cl. 260—112.5)

The present invention provides a process for the manufacture of new cyclic decapeptides of the formula cyclo-(A-B-L-leucyl-D-phenylalanyl-L-prolyl)$_2$ in which A represents the radical of an L-α-amino acid of the formula

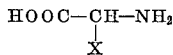

in which X represents hydrogen or a lower alkyl group containing 1–5 carbon atoms, for example glycine, L-valine or L-leucine, and B stands for the radical of a natural amino acid containing 2–9 carbon atoms or, if it contains an additional functional group, at least 6 carbon atoms, also those which contain an aromatic radical or a further amino group—for example, glycine, L-alanine, L-valine, L-leucine, L-lysine, L-tyrosine—and of the salts thereof.

The new decapeptides possess good action as antibiotics against bacteria, fungi and virus bodies and can, therefore, be used as antibiotics or preservatives. An excellent action characterizes the decapeptide in which the amino acid B is L-lysine.

It was surprising that the decapeptides of the invention like gramicidin, possess a strong antibiotic action although they do not contain, for example, the "rare" amino acid L-ornithine which had been considered essential for the biological action of gramicidin (see J. I. Harries and T. S. Work, Nature, 161, 804 [1948]; Biochemical Journal, 46, 196, 582 [1950]).

It is a special advantage of the new decapeptides that they can be synthesized from amino acids which are more readily accessible and less expensive to prepare than the amino acids from which gramicidin is made, more especially ornithine, and that the coupling of these amino acids yielding the decapeptide is likewise simpler.

To obtain the new compounds, a salt of an A-B-L-leucyl-D-phenylalanyl-L-prolyl ester in which A and B have the meanings given above and in which an amino group, if present in B, is protected and which contains an electron-attracting substituent in the hydroxy component which is either a monovalent, saturated, aliphatic alcohol, such as, for example, methanol, ethanol, or a monovalent phenol, such as naphthol or especially phenol—is treated with a basic agent and any protected amino groups present in the B-radical are liberated. Alternatively, a salt of a corresponding linear decapeptide ester, in which any amino groups present are protected and which contains an electron-attracting substituent in the hydroxy component, is treated with a basic agent and any protected amino groups present are liberated.

The hydroxy component of the ester can contain one or more electron-attracting substituents. Such substituents are radicals which are meta-directing in aromatic rings (cf. Fieser and Fieser, Organic Chemistry, 3rd Ed., 1956, page 557), and halogen atoms, particularly the cyano, nitro, sulpho or methanesulfonyl group. In the case of aliphatic alcohols the electron-attracting substituent is preferably at the carbon atom bound to the hydroxy group, in the case of phenols preferably in para-position. As examples of hydroxy components may be mentioned the radical of cyanomethyl alcohol, of para-nitrophenol or of para-methane-sulfonyl phenol.

The salts of peptide carboxylic acid esters used as starting materials, which contain an electron-attracting substituent in the hydroxy component, can be obtained, for example, by reacting the N-triphenylmethyl peptide with a hydrohalic acid ester of the alcohol concerned in the presence of a tertiary organic base and subsequent elimination of the triphenylmethyl radical by treatment with a dilute acid; or by catalytic hydrogenation of a suitable ester of the N-carbobenzoxy-peptide in the presence of an acid. Salts suitable for the reaction according to the present invention more especially those of the hydrohalic acids such as hydrochloric acid, hydrobromic acid, or of halogenated fatty acids such as trifluoroacetic acid.

Alkaline agents suitable for use in the reaction according to the invention are, for example, inorganic bases such as the hydroxides or carbonates of alkali metals, such as sodium hydroxide solution, potassium hydroxide solution, sodium carbonate, or organic bases, preferably tertiary amines, such as pyridine or triethyl amine.

The process is advantageously carried out in the presence of an organic solvent such as dimethyl-formamide, acetonitrile, dioxane, tetrahydrofuran or mixtures of such solvents, if desired also in the presence of water. The yield can be enhanced by adding an acid catalyst, such as glacial acetic acid or sulfuric acid, to the salt of the peptide ester.

The cyclic decapeptides obtainable by the present process display good antibiotic activity against several test organisms. By using as testing method in vitro series of progressive dilutions (powers of 10) in glucose bouillon, incubated for 24 hours at 37° C., there are obtained, for example, for c-(L-valyl-L-lysyl-L-leucyl-D-phenylalanyl-L-prolyl)$_2$.2HCl, the following concentrations at which inhibition is still observed:

| Test organism: | Inhibiting concentration, gram per cc. |
|---|---|
| Staphylococcus aureus | 10$^{-5}$ |
| Streptococcus haemolyticus | 10$^{-5}$ |
| Streptococcus viridans | 10$^{-5}$ |
| Streptococcus faecalis | 10$^{-4}$ |
| Corynebacterium diphtheriae | 10$^{-6}$ |
| Escherichia coli | 10$^{-4}$ |
| Salmonella typhosa | 10$^{-4}$ |
| Salmonella schottmulleri | 10$^{-4}$ |
| Shigella sonnei | 10$^{-4}$ |
| Pasteurella pestis | 10$^{-4}$ |
| Vibrio cholerae (El Tor) | 10$^{-4}$ |
| Bacillus megatherium | 10$^{-5}$ |
| Endomyces albicans (Soor) | 10$^{-4}$ |
| Candida vulgaris (Soor) | 10$^{-4}$ |

The decapeptides of the invention and their salts are accordingly suitable as medicaments, for example, in the form of pharmaceutical preparations that contain the specified compounds in admixture with a pharmaceutical organic or inorganic excipient suitable for enteral, parenteral or local administration. Suitable excipients are substances that do not react with the new compounds, for example, gelatin, lactose, starch, magnesium stearate, talc, vegetable oils, benzyl alcohols, gums, polyalkylene glycols, white petroleum jelly, cholesterol or other known medicinal excipients. The pharmaceutical preparations may be, for example, in the form of tablets, dragees, powders, ointments, creams, suppositories or in liquid form as solutions, suspensions or emulsions. They may be sterilized and/or contain assistants such as preservatives, stabilisers, wetting agents or emulsifiers. If desired, they may contain further therapeutically valuable substances.

The following examples illustrate the present invention:

*Example 1.—Cyclo-(L-leucyl-L-leucyl-L-leucyl-D-phenylalanyl-L-prolyl)$_2$*

430 mg. of L-leucyl-L-leucyl-L-leucyl-D-phenylalanyl-L-proline-para-nitrophenyl ester trifluoracetate are dissolved in 8.5 cc. of dimethyl formamide and 4 drops of glacial acetic acid, and in the course of 4½ hours this solution is added dropwise at 55° C. to 86 cc. of pyridine.

The solvent is then evaporated and the residue chromatographed in a mixture of 150 cc. of methanol and 65 cc. of water over strongly acid and strongly basic ion exchangers. The product (230 mg.=77% of theory) is chromatographed over 7 grams of alumina and washed with benzene and chloroform. A mixture of chloroform and ethyl acetate eluted 210 mg. of ninhydrin-negative substance which was purified by multiplicative distribution in the system carbon tetrachloride/methanol/water (10:9:1). There is obtained cyclo-(L-leucyl-L-leucyl-L-leucyl-D-phenylalanyl-L-prolyl)$_2$ of M.P. 132–134° C., $C_{64}H_{98}O_{10}N_{10}$.

The trifluoroacetate of the pentapeptide-para-nitrophenyl ester, used as starting material, can be prepared thus:

(a) Cbo-leu-leu-NHNH$_2$ (L—L)

2 grams of Cbo-L-leucyl-L-leucine methyl ester (Cbo=carbobenzoxy)

are refluxed for 2½ hours with 10 cc. of absolute methanol and 0.75 cc. of hydrazine hydrate; the clear solution is evaporated in vacuo and the solid residue recrystallized from aqueous ethanol. Yield: 1.75 grams=87% of theory of carbobenzoxy-L-leucyl-L-leucine hydrazide. M.P. 152–152.5° C.

(b) Cbo-leu-leu-leu-phe-pro-OCH$_3$ (L—L—L—D—L)

395 mg. of Cbo-leu-leu-NHNH$_2$ are dissolved in 4 cc. of glacial acetic acid and 12 cc. of 0.5 N-hydrochloric acid and at 0° C. 85 mg. of sodium nitrite are added. The azide thus formed is taken up in ethyl acetate and in the usual manner reacted for 2 days at 0° C. with 400 mg. of H-leu-phe-pro-OCH$_3$ (L—D—L). The gelatinous precipitate is dissolved in a large amount of ethyl acetate and washed with dilute hydrochloric acid and sodium bicarbonate solution. The ethyl acetate phase is dried and evaporated and the residue crystallized from aqueous ethanol. Yield: 400 mg.=53% of theory of carbobenzoxy-L-leucyl-L-leucyl - L - leucyl-D-phenylalanyl-L-proline-methyl ester. M.P. 180–181° C. Optical rotation $[\alpha]_D^{23}$=−69°±4° (c.=1.25 in ethanol).

(c) HCl, H-leu-leu-leu-phe-pro-OCH$_3$
(L—L—L—D—L)

9.87 grams of carbobenzoxy pentapeptidemethyl ester (see under (b) above) are hydrogenated in 200 cc. of methanol and 15 cc. of N-hydrochloric acid with 1 gram of palladium-carbon of 10% strength and hydrogen under atmospheric pressure at room temperature. When the calculated amount of 300 cc. of hydrogen has been taken up, the reaction mixture is suction-filtered and evaporated. The product obtained is a colorless foam (5.3 grams=62% of theory) of the hydrochloride of L-leucyl-L-leucyl-L-leucyl-D-phenylalanine-L-proline-methyl ester.

(d) T-leu-leu-leu-phe-pro-OCH$_3$ (L—L—L—D—L)
(T=trityl=triphenyl methyl)

1 gram of pentapeptide methyl ester hydrochloride (see under (c) above) is dissolved in 10 cc. of absolute chloroform and 0.65 cc. of triethylamine, 650 mg. of triphenylchloromethane are added, and the mixture is kept for 18 hours at room temperature. The solvent is evaporated and the residue chromatographed with benzene over alumina. The triphenylchloromethane and triphenylcarbinol are washed out of the column and the tritylpentapeptide methyl ester is eluted with chloroform and ethyl acetate. Yield: 740 mg. (=56% of theory) in the form of an amorphous foam.

(e) T-leu-leu-leu-phe-pro-OH (L—L—L—D—L)

740 mg. of the methyl ester according to (d) above are hydrolyzed in 30 cc. of dioxane, 6 cc. of methanol and 17.2 cc. of 0.5 N-sodium hydroxide solution at 37° C. The yield of acid, trityl-L-leucyl-L-leucyl-L-leucyl-D-phenylalanyl-L-proline obtained in the form of an amorphous foam, amounts to 96% of theory.

(f) T-leu-leu-leu-phe-pro-OC$_6$H$_4$NO$_2$ (L—L—L—D—L)

700 mg. of trityl-pentapeptide acid according to (e) above are dissolved in 8 cc. of pyridine and mixed with 1.3 grams of di-(para-nitrophenyl)-sulphite. After 15 hours, ice-cold citric acid solution is added and after 1½ hours the whole is extracted at 0° C. with ethyl acetate, washed and dried. The nitrophenyl ester of trityl-pentapeptide is obtained in the form of a resin. Yield 685 mg.=86% of theory.

(g) F$_3$C-COOH,H-leu-leu-leu-phe-pro-OC$_6$H$_4$NO$_2$
(L—L—L—D—L)

685 mg. of trityl-pentapeptide-para-nitrophenyl ester according to (f) above are dissolved in 14 cc. of trifluoroacetic acid and 14 cc. of water are slowly added at −5° C. to −10°C. The solution is lyophilized and the residue is triturated with a 1:1 mixture of ether and petroleum ether. Yield: 430 mg. (=72% of theory) of a pale-brown powder of the trifluoroacetate of pentapeptide-p-nitrophenyl ester.

*Example 2.—Cyclo-(valyl-tyrosyl-leucyl-phenylalanyl-prolyl)$_2$ (L—L—L—D—L)$_2$*

1.1 grams of L-valyl-L-tyrosyl-L-leucyl-D-phenylalanyl-L-proline-para-nitrophenyl ester trifluoroacetate are dissolved in 22 cc. of dimethyl formamide and 1 cc. of glacial acetic acid, and the solution is slowly added dropwise at 55° C. to 220 cc. of pyridine, the addition taking 4½ hours. The solution is evaporated in vacuo for another 1¾ hours. The residue is dissolved in a warm mixture of 250 cc. of methanol and 100 cc. of water and filtered through a heated column of a strongly acid ion exchanged. The column is then washed with another 500 cc. of the warm mixture. The filtrates are evaporated in vacuo and the residue is triturated with ethyl acetate. Yield: 540 mg. (=69% of theory) of a pale-brown powder. Paper-chromatographic examination of the product reveals that it is unitary (Pauly reagent) and gives a negative ninhydrin reaction. The compound is distributed in the system carbon tetrachloride+chloroform+methanol+water (7:3:7:3) over 24 stages (separating factor substance: nitrophenol in this system=19). The pure fractions of cyclo - (valyl - tyrosyl - leucyl-phenylalanyl-prolyl)$_2$ (L—L—L—D)$_2$ crystallize in the shape of spherical agglomerates from aqueous ethanol. M.P. 191° C. $C_{68}H_{90}C_{12}N_{10} \cdot 3H_2O$.

The trifluoroacetate of pentapeptide-para-nitrophenyl ester, used as starting material can be prepared thus:

(a) Cbo-val-tyr-leu-phe-pro-OCH$_3$ (L—L—L—D—L)

9.49 grams of carbobenzoxy-L-valyl-L-tyrosine hydrazide are converted into the azide with 90 cc. of glacial acetic acid, 260 cc. of 0.5 N-hydrochloric acid and 1.88 gram of sodium nitrite, and the azide is reacted at 0° C. with 9 grams of L-leucyl-D-phenylalanyl-L-proline methyl ester in 200 cc. of ethyl acetate. Carbobenzoxy-L-valyl-L - tyrosyl-L-leucyl-D-phenylalanyl-L-proline-methyl ester separates in crystalline form. Yield: 12.8 grams=73% of theory. M.P. 214–215° C. Optical rotation $[\alpha]_D^{28}$= −59°±4° (c.=1.04 in glacial acetic acid).

(b) H-val-tyr-leu-phe-pro-OCH$_3$ (L—L—L—D—L)

11.4 grams of Cbo-val-tyr-leu-phe-pro-OCH$_3$ (L—L—L—D—L)

described in (a) are hydrogenated in 120 cc. of methanol and 16 cc. of N-hydrochloric acid with 1 gram of palladium-carbon of 10% strength under atmospheric pressure. When the calculated amount of hydrogen has been absorbed, the catalyst is filtered off and the filtrate is evaporated, the residue being dissolved in boiling water. On cooling, the pentapeptide methyl ester crystallizes out. Yield: 9.36 grams=94% of theory. M.P. 209–210° C. According to its analysis, the product is not the hydrochloride but the free pentapeptide ester.

(c) T-val-tyr(T)-leu-phe-pro-OCH₃ (L—L—L—D—L)

10.2 grams of H-val-tyr-leu-phe-pro-OCH₃

(L—L—L—D—L)

described in (b) and 6 cc. of triethylamine are dissolved in 100 cc. of absolute chloroform and treated with 11 grams of triphenylchloromethane. The whole is shaken with dilute hydrochloric acid and then with water, and evaporated. The residue is repeatedly reprecipitated from benzene+petroleum ether. Yield: 93% of theory of T-L-valyl-L-tyrosyl-(T)-L-leucyl-D-phenylalanyl-L-proline-methyl ester (T=trityl=triphenylmethyl). M.P. 129° C. Optical rotation $[\alpha]_D^{23} = -47° \pm 4°$ (c.=1.11 in ethanol).

(d) T-val-tyr(T)-leu-phe-pro-OH (L—L—L—D—L)

600 mg. of T-valyl-tyr(T)-leu-phe-pro-OCH₃ (L—L—L—D—L) described in (c) are dissolved in 24 cc. of dioxane and 5 cc. of methanol and mixed with 13.4 cc. of 0.5 N-methanol. The hydrolysis is complete after ¾ hour at 37° C. The solution is concentrated in vacuo and poured into an excess of ice-cold citric acid solution. The acid is extracted with ethyl acetate, filtered in benzene through a column of Floridin XXS and reprecipitated from benzene+petroleum ether. M.P. 159° C. Yield: 95% of theory of trityl-L-valyl-O-trityl-L-tyrosyl-L-leucyl-D-phenylalanyl-L-proline.

(e) T-val-tyr(T)-leu-phe-pro-OC₆H₄NO₂

(L—L—L—D—L)

1.56 grams of ditrityl-pentapeptide acid according to (d) above and 2.2 grams of di-(para-nitrophenyl)-sulfite are dissolved in 15 cc. of pyridine and kept for 5 hours. At 0° C. an excess of citric acid solution is then added and the whole extracted with ethyl acetate. The ethyl acetate extract is washed with water, dried and evaporated. On being triturated with ether+petroleum ether (1:1) the residue becomes solid. Yield: 1.30 grams=73% of theory of ditrityl-pentapeptide-p-nitro-phenyl ester.

(f) F₃C-COOH,H-val-tyr-leu-phe-pro-OC₆H₄NO₂

(L—L—L—D—L)

1.47 grams of ditrityl-pentapeptide-para-nitrophenyl ester according to (e) above are dissolved in 30 cc. of trifluoracetic acid and at −5° to −10° C. 30 cc. of water are slowly stirred in, the whole is then lyophilized and the residue triturated with ether+petroleum ether 1:1 and 1:2 as well as with ether. Yield: 1.0 gram (=97% of theory) of a solid powder of trifluoracetate of L-valyl-L-tyrosyl-L-leucyl-D-phenylalanyl-L - proline-p-nitrophenyl ester.

*Example 3.—Cyclo-(glycyl-lysyl-leucyl-phenylalanyl-prolyl)₂ 2HBr (L—L—D—L)₂*

1.02 grams of glycyl-(MZ)-L-lysyl-L-leucyl-D-phenylalanyl-L-proline-p-nitrophenyl ester trifluoracetate—in which MZ represents para-methoxy-phenyl-azo-carbobenzoxy—are dissolved in 20 cc. of dimethyl formamide with the addition of 8 drops of glacial acetic acid. In the course of 6 hours this solution is stirred dropwise at 55° C. into 200 cc. of pyridine. The mixture is stirred for a further 2 hours at 55° C., the solvent is evaporated in vacuo, and the residue is dissolved in 150 cc. of methanol and 40 cc. of water and then filtered through columns of Merck I and III ion exchangers. The columns are washed quantitatively with methanol+water (2:1), and the filtrate is evaporated to dryness in vacuo. The residue is recrystallized from aqueous ethanol to yield 500 mg. (=64% of theory) of a microcrystalline product, cyclo-(gly-(MZ)-lys-leu-phe-pro)₂ (L—L—D—L) which, after having been twice recrystallized, melts at 241–143° C.

1.13 grams of cyclo-[gly-(MZ)-lys-leu-phe-pro]₂ (L—L—D—L) are mixed with 4.2 cc. of 4 N-hydrobromic acid in glacial acetic acid and heated for 1 hour at 40° C. After about 20 minutes the para-methoxy-phenyl-azobenzyl bromide begins to crystallize. The glacial acetic acid is evaporated in vacuo and the residue distributed between carbon tetrachloride+chloroform 1:1 and water. The aqueous phase is shaken a few times with carbon tetrachloride+chloroform 1:1 and then evaporated to dryness in vacuo. The residue is dissolved in a few drops of aqueous hydrogen bromide, and absolute acetone is added, whereby cyclo-(glycyl-lysyl-leucyl-phenylalanyl-prolyl)₂2HBr(L—L—D—L)₂ is obtained in fine white crystalline needles. Yield: 775 mg.=89% of theory. M.P. 199–200° C.

*Conversion into the hydrochloride.*—The hydrobromide is dissolved in methanol+water 2:1, filtered through appropriately pre-treated, with sodium hydroxide solution, and neutrally washed strongly basic ion exchanger (e.g., Merck III), and the filtrate is acidified with 2 N-hydrochloric acid. After evaporation of the solvent the residue can be crystallized from 2 N-hydrochloric acid and acetone. The product forms small white rods melting at 199–201° C. Optical rotation $[\alpha]_D^{25.5} = -147° \pm 1.5°$ (c.=1.01 in N-hydrochloric acid).

The starting material can be prepared thus:

(a) (Nᵉ-para-methoxy-phenyl-azo-carbobenzoxy)-L-lysine (MZ-lysine)

5 grams of L-lysine monohydrochloride are dissolved in 150 cc. of water and boiled for 2 hours with 7.5 grams of basic copper carbonate. The mixture is suction-filtered while still hot, the filtrate treated with 200 cc. of acetone, 1.65 grams of magnesium oxide is added, and in the course of one hour a solution of 10 grams of carbonic acid-(para-methoxy-phenyl-azo-benzyl ester)-chloride (MZ-chloride) in 50 cc. of acetone is stirred in dropwise. The mixture is stirred for a further 2 hours, and the copper complex is suctioned off, and washed with water, ethanol and ether, then suspended in 75 cc. of 2 N-hydrochloric acid and heated for 10 minutes at 60° C., with the precipitate changing color from greenish yellow to golden yellow. The MZ-lysine is suctioned off, washed with water and dried in vacuo at 50° C. Yield: 9.1 grams=80% of theory. M.P. 242–243° C. after decomposition. The product is extremely sparingly soluble and is therefore further worked up without purification.

(b) Nᵉ-MZ-L-lysine-Nα-carboxy anhydride

Phosgene is introduced for 1 hour at 40° C. into a suspension of 11.2 grams of crude MZ-lysine according to (a) in 300 cc. of tetrahydrofuran. Some undissolved matter is suctioned off, and the solvent is completely evaporated in vacuo. The residue (9.84 grams=83% of theory) is the sparingly soluble Nα-carboxy anhydride of Mᵉ-MZ-L-lysine which is further worked up in the crude state.

(c) Nᵉ-MZ-L-lysine methyl ester hydrochloride 9.84 grams of crude Nα-carboxy anhydride according to (b) are boiled for 5 minutes with 17 cc. of absolute methanol and 30 cc. of 1.5 N-hydrochloric acid in methanol, whereby the carboxy anhydride is completely dissolved. The solvent is evaporated in vacuo, and the residue is dissolved in absolute methanol and treated with absolute ether. Scratching causes the crystallization of the ester hydrochloride to commence. For the analysis the product is once more recrystallized in identical manner. Yield: 7.1 grams=68% of theory of $N^\epsilon$-MZ-L-lysine-methyl ester hydrochloride. M.P. 241° C. after decomposition.

(d) Trityl-gly-(MZ)-lys-OCH₃ (L)

7.0 grams of MZ-lysine methyl ester hydrochloride are mixed with 11 cc. of tetrahydrofuran, 4.7 cc. of triethylamine, 5.35 grams of trityl-glycine cyanomethyl ester and 1 cc. of glacial acetic acid and stirred for 3 days at room temperature. 1 cc. of water is then added and the mixture is stirred for another hour, then taken up in 300 cc. of ethyl acetate and washed with water, sodium bicarbonate solution and citric acid solution, then dried and evaporated to dryness in vacuo. The red resin obtained in this manner is dissolved in ethyl acetate and filtered through a column of alumina. Evaporation of the solvent leaves 9.2 grams of resin=84% of theory of trityl-glycyl-(MZ)-L-lysine-methyl ester. This resin cannot be crystallized.

(e) Trityl-gly-(MZ)-lys-NHNH₂ (L)

9.2 grams of trityl-gly-(MZ)-lys-OCH₃ according to (d) are dissolved in 47 cc. of warm methanol, 1.85 cc. of hydrazine hydrate are added; the whole is refluxed for 2 hours, evaporated to dryness in vacuo, and the residue is dissolved in hot carbon tetrachloride, and the hydrazide is allowed to crystallize. Yield: 5.3 grams=58% of theory of trityl-glycyl-(MZ)-L-lysine hydrazide. The product is recrystallized from benzene+carbon tetrachloride (fine yellow needles). M.P. 154–155° C.

(f) Trityl-gly-(MZ)-lys-leu-phe-pro-OCH₃
(L—L—D—L)

1.12 grams of trit-gly-(MZ)-lys-NHNH₂ according to (e) are dissolved at −10° C. in a mixture of 11 cc. of glacial acetic acid and 7.7 cc. of N-hydrochloric acid. 10 cc. of ice water and then an aqueous solution of 130 mg. of sodium nitrite are added. The azide precipitates in solid form. Another 10 cc. of ice water are added, the whole is kept for 5 minutes in the ice-sodium chloride mixture, the azide is suctioned off and washed with ice water until neutral. The moist azide is dissolved at −10° C. in ethyl acetate, and the ethyl acetate solution is washed with ice-cold saturated sodium chloride solution and subjected to a short drying. The ethyl acetate solution of the azide is then filtered into an ice-cold solution of H-leu-phe-pro-OCH₃ (obtained from 660 mg. of HCl-H-leu-phe-pro-OCH₃) in ethyl acetate. The whole is kept for 2 days at −5° C. and then overnight at room temperature. The ethyl acetate solution is extracted with citric acid solution and sodium bicarbonate solution, washed until neutral, dried, and the ethyl acetate is completely evaporated in vacuo. The residue is dissolved in ethanol+water 9:1 (γ:γ), filtered through a column of alumina, and washed with the same mixture. The filtrate is evaporated and dried. Yield: 1.4 gram=84% of theory of trityl-glycyl-(MZ)-L-lysyl-L-leucyl-D-phenylalanyl-L-proline-methyl ester. The product is a solid foam of yellow-orange color which cannot be crystallized. For complete purification a specimen of the product is subjected to a Craig distribution over 42 stages in carbon tetrachloride+methanol+water 10:9:1. The fractions 4 to 12 are pure and are used for the analysis; this material does not crystallize either.

(g) Trityl-gly-(MZ)-lys-leu-phe-pro-OH (L—L—D—L)

1.16 grams of trit-gly-(MZ)-lys-leu-phe-pro-OCH₃ according to (f) are dissolved in a mixture of 35 cc. of dioxane and 6 cc. of methanol. 4.2 cc. of 0.5 N-sodium hydroxide solution are added, and the whole is kept for 1¼ hours at room temperature. The solution is extensively concentrated in vacuo, and ice-cold water is added to the residue to precipitate the sodium salt. On acidification with citric acid solution a fine precipitate is formed which is dissolved in ethyl acetate, and this solution is washed until neutral, dried, and evaporated to dryness in vacuo. Yield: 1.13 gram=99% of theory of trityl-glycyl-(MZ)-L-lysyl-L-leucyl-D-phenylalanyl-L-proline.

(h) Trityl-gly-(MZ)-lys-leu-phe-pro-OC₆H₄-NO₂ (para)
(L—L—D—L)

1.13 grams of trit-gly-(MZ)-lys-leu-phe-pro-OH according to (g) are dissolved in 11 cc. of pyridine. 1.7 grams of di-para-nitrophenyl-sulphite) is added, and the mixture is kept for 2 days at room temperature. The pyridine is partially evaporated in vacuo, ice water is added, and the whole is acidified with citric acid. To decompose the excess of sulfite the mixture is kept for 1 hour at 0° C., then extracted with ethyl acetate, and the extract is washed until neutral. The solution is dried and evaporated, and the residue is triturated with ether+petroleum ether 1:2 and 1:1, until all nitrophenol has been removed. There remain 1.19 grams (=94% of theory) of a yellow orange powder which is trityl-glycyl-(MZ)-L-lysyl-L-leucyl-D-phenylalanyl-L-proline-p-nitrophenyl ester.

(i) CF₃COOH-H-gly-(MZ)-lys-leu-phe-pro-OC₆H₄NO₂
(para) (L—L—D—L—L)

1.19 grams of trit-gly-(MZ)-lys-leu-phe--pro-
OC₆H₄NO₂

(L—L—D—L) according to (h) is dissolved in 24 cc. of trifluoroacetic acid and 24 cc. of water are slowly stirred in at −5° to −10° C. After 15 minutes at 0° C. the solution is lyophilized, and the residue, the trifluoroacetate of trityl-pentapeptide-p-introphenyl ester, is intimately triturated with ether+petroleum ether 1:1. Yield: 1.02 grams (=96% of theory) of a yellow powder.

*Example 4.—Cyclo-(val-tos-lys-leu-phe-pro)₂*
*(L—L—L—D—L)₂*

(A) 460 mg. of L-valyl-N𝜖-tos-lysyl-L-leucyl-D-phenylalanyl - L - proline-p-nitro-phenyl ester trifluoroacetate (tos=tosyl=p-toluolsulphonyl) are dissolved in 9.2 cc. of dimethyl formamide. 10 drops of glacial acetic acid are added and in the course of 4 hours the whole is stirred dropwise into 92 cc. of pyridine at 55° C., then stirred on for 2 hours at the same temperature, and evaporated to dryness in vacuo. The radical is dissolved in 100 cc. of methanol+isopropanol+water 1:1:1, filtered successively through a suitably pre-treated strongly acid and a strongly basic ion exchanger (Merck I and III) and washed with 400 cc. of the same mixture. The filtrate is evaporated to dryness in vacuo, and the radical is crystallised from aqueous methanol to yield 138 mg. of a crude product (=34% of theory). This product is distributed over 48 stages in a system of carbon tetrachloride+methanol+water 10:9:1. The pure fractions of cyclo - (val - tos - lys - leu-phe-pro)₂(L—L—L—D—L)₂ amount to 85.5 mg.=21% of theory, distribution number=0.68. The cyclo-decapeptide crystallises in white prisms from aqueous methanol, and melts at 266–269° C. after decomposition. The product is dried for 3 hours at 110° C′ under 10⁻² mm. pressure over phosphorus pentoxide.

(B) A solution of 420 mg. of CF₃COOH-H-val-tos-lys-leu-phe-pro-OC₆H₄NO₂ in 8 cc. of dimethyl formamide, containing 10 drops of glacial acetic acid, is stirred dropwise at 55° C. in the course of 5 hours into 84 cc. of pyridine, then stirred for a further 2 hours, evaporated to dryness in vacuo, and the radical is dissolved in 150 cc. of methanol+isopropanol+water 1:1:1. This solution is filtered through the two ion exchangers as described under sub (A) above and washed with 200 cc. of mixture. The solvent is evaporated in vacuo and the radical recrystallised from aqueous methanol to yield 70 mg. of crude product. From the mother liquor another 15 mg. of substance are obtained by chromatography over alumina, elutriation with chloroform and recrystallisation from aqueous methanol. Yield of crude product: 27% of theory. This product is distributed between 30 stages in the system carbon tetrachloride+methanol+water 10:9:1. Distribution number: 0.65. The pure fractions amount to 70 mg.=23% of theory. M.P. 263° C. after decomposition. Optical rotation $[\alpha]_D^{22}$=—225; —227°±4° (c.=0.622 in glacial acetic acid). This product is identical with the product obtained according to (A) above.

100 grams of cyclo - (val - tos - lys - leu - phe - pro)$_2$ are introduced into 100 cc. of liquid ammonia distilled over sodium, and sodium is added until the blue color no longer disappears; consumption of sodium: about 120 mg. To destroy the sodium and convert the product into the hydrochloride 600 mg. of ammonium chloride are added to the mixture, the ammonia is allowed to evaporate and the radical is extracted at 30–40° C. The radical is triturated with a small quantity of N-hydrochloric acid, the solid precipitate is suctioned off and washed with N-hydrochloric acid. Yield, after drying in a high vacuum at 70° C.: 38 mg. of cyclo - (val - lys - leu - phe - pro)$_2$, 2HCl, 1H$_2$O (L—L—L—D—L) of M.P.>260° C. The distribution coefficient is 1.05 mm., system chloroform-methanol 0.01 N-hydrochloric acid 10:7:3 (vol.).

The trifluoroacetate of the pentapeptide - paranitrophenyl ester, used as starting material, can be prepared thus:

(a) N$^\epsilon$-para-toluenesulfonyl-L-lysine methyl ester hydrochloride 23 grams of N$^\epsilon$-toluenesulfonyl-L-lysine are dissolved in 550 cc. of absolute methanol, and this solution is saturated with hydrochloric acid gas while stirring and cooling with a mixture of ice and salt. The mixture is kept for 1 hour at room temperature, and the methanol is evaporated in vacuo, the whole process then being repeated once more. The resulting crude ester hydrochloride is recrystallised from absolute ethanol+ether, whereupon its melting point is 135° C. Yield: 26 grams=97% of theory.

(b) Cbo-L-valyl-N$^\epsilon$-tos-L-lysine methyl ester

In the course of about 1 hour a solution of 0.74 cc. of phosphorus hydroxychloride in 3 cc. of tetrahydrofuran is stirred dropwise at —5° C. into a mixture of 1 gram of Cbo-L-valine, 1.4 grams of N$^\epsilon$-tosyl-L-lysine methyl ester hydrochloride according to (a), 2.2 cc. of triethylamine and 20 cc. of tetrahydrofuran. The whole is stirred for a further 2 hours while being cooled with ice, the excess of phosphorus hydroxychloride is destroyed with a small amount of water and the tetrahydrofuran evaporated in vacuo. The radical is dissolved in ethyl acetate and water, and the solution in ethyl acetate is washed with 2 N-hydrochloric acid and sodium bicarbonate solution, dried over sodium sulfate, evaporated to dryness, and the radical is recrystallised from aceton+ether. Yield: 1.81 grams=83% of theory of Cbo-L-valyl-N$^\epsilon$-tos-L-lysine-methyl ester. M.P. 130° C. Optical rotation $[\alpha]_D^{18}$=—8°+4° (c.=0.958 in glacial acetic acid). The identical product can be prepared from Cbo-valine-para-nitrophenyl ester and N$^\epsilon$-tosyl-lysine methyl ester hydrochloride; in this case the yield is 67% of the theoretical.

(c) Cbo-L-valyl-N$^\epsilon$-tos-L-lysine hydrazide 10 grams of Cbo-L-valyl-N$^\epsilon$-tosyl-L-lysine methyl ester according to (b) are refluxed for 40 hours with 100 cc. of absolute ethanol and 2.6 cc. of hydrazine hydrate, whereby the methyl ester passes into solution and the hydrazide begins to precipitate after a short time. The hydrazide is suctioned off and washed with ether. Yield: 7 grams=70% of theory of Cbo-L-valyl-N$^\epsilon$-tos-L-lysine hydrazide. M.P. 209° C. When water is added to the mother liquor, 19% of unchanged methyl ester are recovered therefrom.

(d) Cbo-val-tos-lys-leu-phe-pro-OCH$_3$
(L—L—L—D—L)

From 1.56 grams of HCl-H-leu-phe-pro-OCH$_3$ with the aid of sodium methylate, the free peptide is prepared which is then dissolved in ethyl acetate.

2 grams of Cbo-val-tos-lys-NHNH$_2$ are dissolved in a mixture of 24 cc. of glacial acetic acid, 36 cc. of N-hydrohloric acid and 36 cc. of water, the solution is cooled to —10° C., and a concentrated solution of 300 mg. of sodium nitrite is added all at once. The precipitated azide is immediately suctioned off, washed 3 times with ice water, dissolved at —10° C. in ethyl acetate, dried over sodium sulfate and then filtered into the above ethyl acetate solution of the tripeptide. The mixture is kept for 7 days at 0° C. After 1 to 2 days N$^\alpha$-carbobenzoxy-N$^\epsilon$-tosyl-pentapeptide-methyl ester begins to crystallise in fine white needles which are suctioned off and washed with ether. Yield: 1.81 grams=55% of theory. M.P. 208–208.5° C. Optical rotation $[\alpha]_D^{23}$=—47; —48°±4° (c.=1.056 in glacial acetic acid).

The ethyl acetate mother liquor is washed with 2 N-hydrochloric acid and then with sodium bicarbonate solution, dried, and completely evaporated. The radical is recrystallised from aqueous ethanol and yields another 500 mg. of pentapeptide ester=15% of theory. In spite of repeated recrystallisation its melting point remains at 142–143° C. This proves that there are different modifications present because, after having been inoculated with the high-melting modification, the low-melting product likewise melts at 206° C. The analysis is correct also for the lower boiling product. Optical rotation $[\alpha]_D^{23}$=—48; —49°±4° (c.=1.146 in glacial acetic acid).

(e) HCl-H-val-tos-lys-leu-phe-pro-OCH$_3$ (L-L-L-D-L)

3.6 grams of Cbo-val-tos-lys-leu-phe-pro-OCH$_3$ according to (d) are dissolved in 40 cc. of glacial acetic acid and 8 cc. of N-hydrochloric acid and hydrogenated in the presence of 300 mg. of palladium-carbon of 10% strength. After 3 hours, the catalyst is suctioned off, the filtrate completely evaporated to dryness, and the radical is evaporated three more times in absolute ethanol. Yield: 3.15 grams=98% of theory of N$^\epsilon$-tosyl-pentapeptide ester hydrochloride. For analysis the product is precipitated from absolute ethanol+ether. M.P. 140° C.

(f) Trit-val-tos-lys-leu-phe-pro-OCH$_3$ (L-L-L-D-L)

2.93 grams of HCl-H-val-tos-lys-leu-phe-pro-OCH$_3$ according to (e) are dissolved in 11 cc. of absolute chloroform and 1.47 cc. of triethylamine, at 0° C. mixed with 1.47 gram of triphenyl-chloromethane, and the whole is kept for 6 hours at room temperature. The chloroform is then completely evaporated in vacuo, and the radical is triturated with ether+petroleum ether 1:2 and 1:1 and finally with water. After having been dried, the radical, N$^\alpha$-trityl-N$^\epsilon$-tosyl-pentapeptide methyl ester, amounts to 3.83 grams=104% of theory. The product is recrystallised from ethyl acetate+ether+petroleum ether, and melts at 111° C. Optical rotation $[\alpha]_D^{24}$=—27; —28°±4° (c.=0.9795 in methanol).

(g) T-val-tos-lys-leu-phe-pro-OH (L-L-L-D-L)

3.83 grams of T-val-tos-lys-leu-phe-pro-OCH$_3$ according to (f) are dissolved in 65 cc. of methanol, 7.7 cc. of N-sodium hydroxide solution are added, and the whole is heated for 2 hours at 36° C. The methanol is evaporated in vacuo until turbidity sets in. This alkaline solution is mixed at 0° C. with an excess of citric acid solution, and the precipitated acid is suctioned off and washed. Yield: 3.5 grams=93% of theory of trityl-L-valyl-tosyl-L-lysyl-L-leucyl-D-phenylalanyl-L-proline. For analysis the product is reprecipitated from benzene+ether+petroleum ether. M.P. 138° C. Optical rotation $[\alpha]_D^{22}$=—34; —36°±3° (c.=1.4 in methanol).

(h) T-val-tos-lys-leu-phe-pro-OC₆H₄NO₂
    para (L–L–L–D–L)

1.16 grams of T-val-tos-lys-leu-phe-pro-OH according to (g) in 3 cc. of pyridine are mixed with 1.9 grams of di(para-nitrophenyl)-sulphite and the mixture is kept for about 1 day at room temperature, then mixed with an excess of citric acid solution and kept for 1 hour at 0° C. The precipitate is dissolved in ethyl acetate, and the resulting solution is washed with citric acid solution, dried, and evaporated to dryness. The radical is intimately triturated with ether+petroleum ether 1:2, 1:1 and 2:1, whereupon it becomes solid. Yield: 1.21 grams=93% of theory of $N^\alpha$-trityl-$N^\epsilon$-tosyl-pentapeptide-p-nitrophenyl ester. Spectroscopic determination of the content reveals a degree of purity of 96.5% (measured in a 1:1 mixture of ethanol and N-sodium hydroxide solution).

(i) CF₃COOH-H-val-tos-lys-leu-phe-pro-
    OC₆H₄NO₂ para (L–L–L–D–L)

A solution of 2.33 grams of T-val-tos-lys-leu-phe-pro-OC₆H₄NO₂ according to (h) in 46 cc. of trifluoroacetic acid is slowly mixed at −5 to −10° C. with 46 cc. of water, whereby triphenylcarbinol is caused to precipitate. The mixture is kept for 15 minutes at 0° C., frozen in a mixture of acetone and solid carbon dioxide and then dried in a high vacuum. The radical is triturated with ether+petroleum ether 1:2 and 1:1 and then with ether, whereupon it immediately becomes solid. Yield: 2.03 grams=98% of theory of the trifluoroacetate of pentapeptide-p-nitrophenyl ester.

(j) T-(val-tos-lys-leu-phe-pro)₂-OCH₃ (L–L–L–D–L)₂

1 gram of HCl-H-val-tos-lys-leu-phe-pro-OCH₃ according to (e) is suspended in 15 cc. of absolute ethyl acetate and 2 cc. of triethylamine are added, whereupon the triethylamine hydrochloride settles out immediately; it is suctioned off, the filtrate is evaporated to dryness and the radical dissolved in acetonitrile. This solution is treated with 1 gram of trit-val-tos-lys-leu-phe-pro-OH and 240 mg. of dicyclohexyl-carbodiimide, and the mixture is kept for 1 day at room temperature. The small amount of precipitate formed is suctioned off, the filtrate evaporated to dryness and the radical dissolved in ethyl acetate and shaken with ice-cold dilute hydrochloric acid. The ethyl acetate solution is dried and completely evaporated to dryness. The radical (2.2 grams) is chromatographed over 22 grams of alumina of activity III. Elutriation with 110 cc. of chloroform and 110 cc. of chloroform+ethyl acetate 1:1 yields 1.67 gram of trityl-decapeptide methyl ester=95% of theory. For analysis the product is reprecipitated from benzene-petroleum ether. M.P. 117° C. Optical rotation $[\alpha]_D^{23}=-48$; $-49° \pm 4°$ (c.=0.855 in methanol).

(k) T-(val-tos-lys-leu-phe-pro)₂-OH (L–L–L–D–L)₂

500 mg. of trityl-decapeptide methyl ester according to (j) are dissolved in 15 cc. of dioxane and 2 cc. of methanol, treated with 5.7 cc. of 0.5 N-sodium hydroxide solution, and heated for 1¾ hours at 37° C. The solution is concentrated in vacuo until strong turbidity occurs and then poured into an excess of ice-cold citric acid solution. The precipitate is suctioned off and washed. Yield: 435 mg. of trityl-decapeptide=88% of theory. The product is reprecipitated from ethyl acetate+petroleum ether and melts then at 137–138° C. Optical rotation $[\alpha]_D^{22}=-61$; $-62° \pm 4°$ (c.=1.119 in methanol).

(l) T-(val-tos-lys-leu-phe-pro)₂-
    OC₆H₄NO₂ para (L–L–L–D–L)₂

490 mg. of trityl-decapeptide according to (k), dissolved in 1.5 cc. of pyridine, are mixed with 450 mg. of di-(para-nitrophenyl)-sulphite and the whole is kept for 24 hours at room temperature, then mixed at 0° C. with an excess of citric acid solution, kept for 30 minutes, extracted with ethyl acetate, and this solution is washed with citric acid solution, dried over sodium sulphate and evaporated to dryness. The radical is triturated with ether+petroleum ether 1:2 and 1:1 until it becomes solid. Yield: 535 mg.=102% of trityl-decapeptide-p-nitrophenyl ester. The product is further worked up without purification.

(m) CF₃COOH-H-(val-tos-lys-leu-phe-pro)₂-
    OC₆H₄NO₂ (L–L–L–D–L)₂

10 cc. of water are added at −5 to −10° C. to a solution of 530 mg. of T-decapeptide-p-nitrophenyl ester in 10 cc. of trifluoroacetic acid. After about 15 minutes the mixture is frozen in a mixture of acetone and solid carbon dioxide and dried in a high vacuum. The radical becomes solid immediately on being triturated with ether+petroleum ether 1+2 and 1:1, and with ether. Yield: 460 mg.=93% of decapeptide-p-nitrophenyl ester trifluoroacetate.

What is claimed is:
Cyclo - (L - valyl - L-lysyl-L-leucyl-D-phenyl-alanyl-L-prolyl)₂.

References Cited by the Examiner

UNITED STATES PATENTS 2,912,427  11/59  Schwyzer et al. _____ 260—112
3,035,041   5/62  Schwyzer et al. _____ 260—112

FOREIGN PATENTS 324,532  11/57  Switzerland.

OTHER REFERENCES

Battersby et al., J.A.C.S. 73 1887 (April 1951).
Burger, Medicinal Chemistry, 2nd Ed., 1960, Interscience Pub. p. 881 referred to.
Erlanger, B. F. et al., Antibacterial Activity, etc. in Science, vol. 131, pp. 669 and 670, Mar. 1960, p. 669 relied on.
Greenstein et al., Chemistry of the Amino Acids, vol. 2 (1961) pp. 775, 1273, 1634, 1635, 1684.
Harris et al., Biochemical Jour. 46, pp. 582–589 (1950).
Katchalski et al. C.A. 48, 7704 i (1954).
Kovacs et al., Nature, vol. 185, No. 4708, Jan. 23, 1960, pp. 266–267 (p. 266 cited).
Noller, C. R., Chemistry of Organic Compounds, W. B. Saunders Co., Philadelphia, 1951 (pp. 464, 466, 589 referred to).
Rubini et al., Proc. Soc. Expt'l Biol. Med. 76, pp. 662–665, (1951).
Schwyzer, R. and Sieber, P Die Synthese von Gramicidin S. Helvetica Chimica Acta, vol. 40, No. 3, (May 1957), p. 624–639.
Simmonds et al., Jour. Biol. Chem. 188, pp. 251–262 (1951).
Wheland, G. W. Advanced Organic Chemistry, 2nd Ed., John Wiley, N.Y., 1954 (p. 736 referred to).

LEON J. BERCOVITZ, *Primary Examiner.*

C. B. PARKER, L. ZITVER, J. R. LIBERMAN,
*Examiners.*